(12) United States Patent
Burke

(10) Patent No.: US 7,699,049 B2
(45) Date of Patent: Apr. 20, 2010

(54) SAW SKID PLATE SHIELD

(76) Inventor: Michael Burke, 6 Lanes End, Sutton, MA (US) 01590

( * ) Notice: Subject to any disclaimer, the term of this patent is extended or adjusted under 35 U.S.C. 154(b) by 0 days.

(21) Appl. No.: 11/260,327

(22) Filed: Oct. 27, 2005

(65) Prior Publication Data

US 2006/0048763 A1    Mar. 9, 2006

Related U.S. Application Data

(63) Continuation-in-part of application No. 10/826,717, filed on Apr. 16, 2004, now abandoned.

(60) Provisional application No. 60/464,618, filed on Apr. 22, 2003.

(51) Int. Cl.
*B28D 1/04* (2006.01)
(52) U.S. Cl. ..................... 125/13.01; 125/14
(58) Field of Classification Search .............. 125/13.01, 125/14; 30/374–377
See application file for complete search history.

(56) References Cited

U.S. PATENT DOCUMENTS

| | | | |
|---|---|---|---|
| 2,519,526 A * | 8/1950 | Wilber ........................ 30/373 |
| 2,996,089 A | 8/1961 | McCarty | |
| 3,511,494 A | 5/1970 | Szentkuti | |
| 4,233,738 A | 11/1980 | Dedrick | |
| 4,334,356 A * | 6/1982 | Krosunger ................... 30/374 |
| 4,729,212 A * | 3/1988 | Rabitsch ....................... 56/119 |
| 4,928,662 A | 5/1990 | Chiuminatta et al. | |
| 5,086,750 A | 2/1992 | Chiuminatta et al. | |
| 5,174,101 A * | 12/1992 | Rabitsch ...................... 56/17.4 |
| 5,305,729 A * | 4/1994 | Chiuminatta et al. .......... 125/12 |
| 5,575,271 A * | 11/1996 | Chiuminatta et al. ..... 125/13.01 |
| 5,579,753 A * | 12/1996 | Chiuminatta et al. .......... 125/12 |
| 5,664,553 A | 9/1997 | Chiuminatta et al. | |
| 6,041,464 A * | 3/2000 | Ebersole ......................... 15/83 |
| 6,736,126 B2 * | 5/2004 | Schroer et al. ............ 125/13.01 |
| 6,776,126 B2 | 8/2004 | Le Lievre et al. | |
| 7,007,686 B1 * | 3/2006 | Zuzelo ..................... 125/13.01 |
| 7,044,120 B1 * | 5/2006 | Rutters et al. .................. 125/36 |
| 7,073,495 B1 * | 7/2006 | Markley .................... 125/13.01 |
| 7,163,010 B2 * | 1/2007 | Markley et al. ................ 125/14 |
| 2003/0178535 A1 * | 9/2003 | Jette .............................. 248/49 |
| 2003/0218310 A1 * | 11/2003 | Volk et al. ................ 280/250.1 |

* cited by examiner

*Primary Examiner*—Maurina Rachuba
(74) *Attorney, Agent, or Firm*—Iandiorio Teska & Coleman

(57) ABSTRACT

A saw skid plate shield including a shield plate body defining a leading edge and a trailing edge and a mechanism such as edge rails for attaching the shield plate body to the skid plate. Both the leading and trailing edges of the skid plate body are beveled and/or rounded to divert debris.

4 Claims, 5 Drawing Sheets

SAW SKID PLATE SHIELD

RELATED APPLICATIONS

The subject application is a continuation-in-part application of and claims priority from U.S. patent application Ser. No. 10/826,717 filed Apr. 16, 2004 now abandoned which claims priority to provisional application No. 60/464,618 filed Apr. 22, 2003.

FIELD OF THE INVENTION

This subject invention relates to a saw skid plate shield useful in concrete cutting saws and other saws.

BACKGROUND OF THE INVENTION

The skid plate of a concrete or other saw performs three primary functions: it supports the saw as the skid plate skids across the surface to be cut, it acts as a blade guide, and it helps ensure a quality cut by the blade. When the skid plate wears, the quality of the cut made by the saw blade degrades.

Thus, U.S. Pat. No. 6,736,126, incorporated herein by this reference, proposes a glide plate assembly with a specially designed plate and a plastic overlay for the plate. The skid plate of the saw is removed and the new glide plate/overlay combination is installed on the saw. The primary focus of the '126 patent is minimizing the gap between the saw blade and the slot ultimately formed in the plastic overlay. In all embodiments, the overlay includes mounting flanges and at least a contoured leading mounting portion which conforms to the leading rounded mounting portion of the glide plate. Thus, although in one embodiment the overlay can be slid onto the specially designed glide plate, it cannot be clipped onto it. Moreover, the need for a specially designed replacement glide plate adds to the cost of the system. Finally, the leading edge of the overlay is straight which can result in debris between the overlay and the surface being cut and also marring or scratching of the surface.

SUMMARY OF THE INVENTION

It is therefore an object of this invention to provide a less complex and less expensive skid plate shield.

It is a further object of this invention to provide a skid plate shield which can be snap fit on and off an existing skid plate and which requires no tools or a specially configured glide plate.

It is a further object of this invention to provide such a skid plate shield which helps reduce debris between the shield and the surface being cut to reduce marring or scratching of the surface.

It is a further object of this invention to provide such a skid plate shield which reduces wear of the skid plate of the saw.

It is a further object of this invention to provide such a skid plate shield which reduces the chance of degradation in finish quality as the saw is used.

It is a further object of this invention to provide such a skid plate shield which is easy to deploy and remove and inexpensive enough to replace as often as necessary.

The subject invention results from the realization that a more convenient, less costly, and easier to use replaceable shield for a saw skid plate can be snapped on and off an existing skid plate thus eliminating the need for a new specially designed glide plate which, according to the prior art, replaces the existing skid plate of the saw.

The subject invention, however, in other embodiments, need not achieve all these objectives and the claims hereof should not be limited to structures or methods capable of achieving these objectives.

In one preferred embodiment, this invention features a saw skid plate shield comprising a shield plate body defining a leading edge and a trailing edge and a mechanism for attaching the shield plate body to the skid plate. Preferably, both the leading and trailing edges of the skid plate body are both beveled and rounded to divert debris.

Typically, the leading edge and the trailing edge are configured the same and the shield body is substantially planar and has no contoured leading or trailing edge mounting portions. In one example, the shield plate body is made of DELRIN® (polyoxymethylene). The shield plate body may have a pre-cut slot along a portion of the length thereof. Typically, the shield plate body and the mechanism for attaching are unitary in construction and the mechanism includes opposing longitudinally extending edge rails. In the preferred embodiment, each edge rail includes a leading edge and a trailing edge both rounded and beveled. Also, each edge rail can be rounded on the outside thereof and extends inwardly to define a channel for receiving the skid plate. Typically, the channel is a C-channel with straight edges and the inside top surface of each edge rail is beveled. Preferably, the shield is configured to have a distance between the edge rail inside surfaces so the shield can be snap fit onto the skid plate as opposed to being skid onto the skid plate. For example, one edge rail can be larger than the other and/or further away from the center of the shield plate body than the other.

One saw skid plate shield in accordance with the subject invention features a shield plate body defining a leading edge and a trailing edge and a mechanism for attaching the shield plate body to the skid plate. Both the leading and trailing edges of the body are beveled and/or rounded to divert debris.

One saw skid plate shield in accordance with this invention features a shield plate body defining a leading edge and a trailing edge and opposing longitudinally extending edge rails on each side of said shield plate body. One of the edge rails is larger than the other and/or further away from the center of the shield plate body than the other so the shield can be snap fit onto the skid plate. Typically, the shield plate body defines the leading and a trailing edge both of which are rounded and beveled to divert debris.

An example of a monolithic skid plate shield in accordance with this invention features a shield plate body defining a leading edge and a trailing edge both configured the same and opposing edge rails extending inwardly over the shield plate body to define channels for receiving the edges of the skid plate. The leading and trailing edges of the skid plate body are preferably both rounded and/or beveled.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
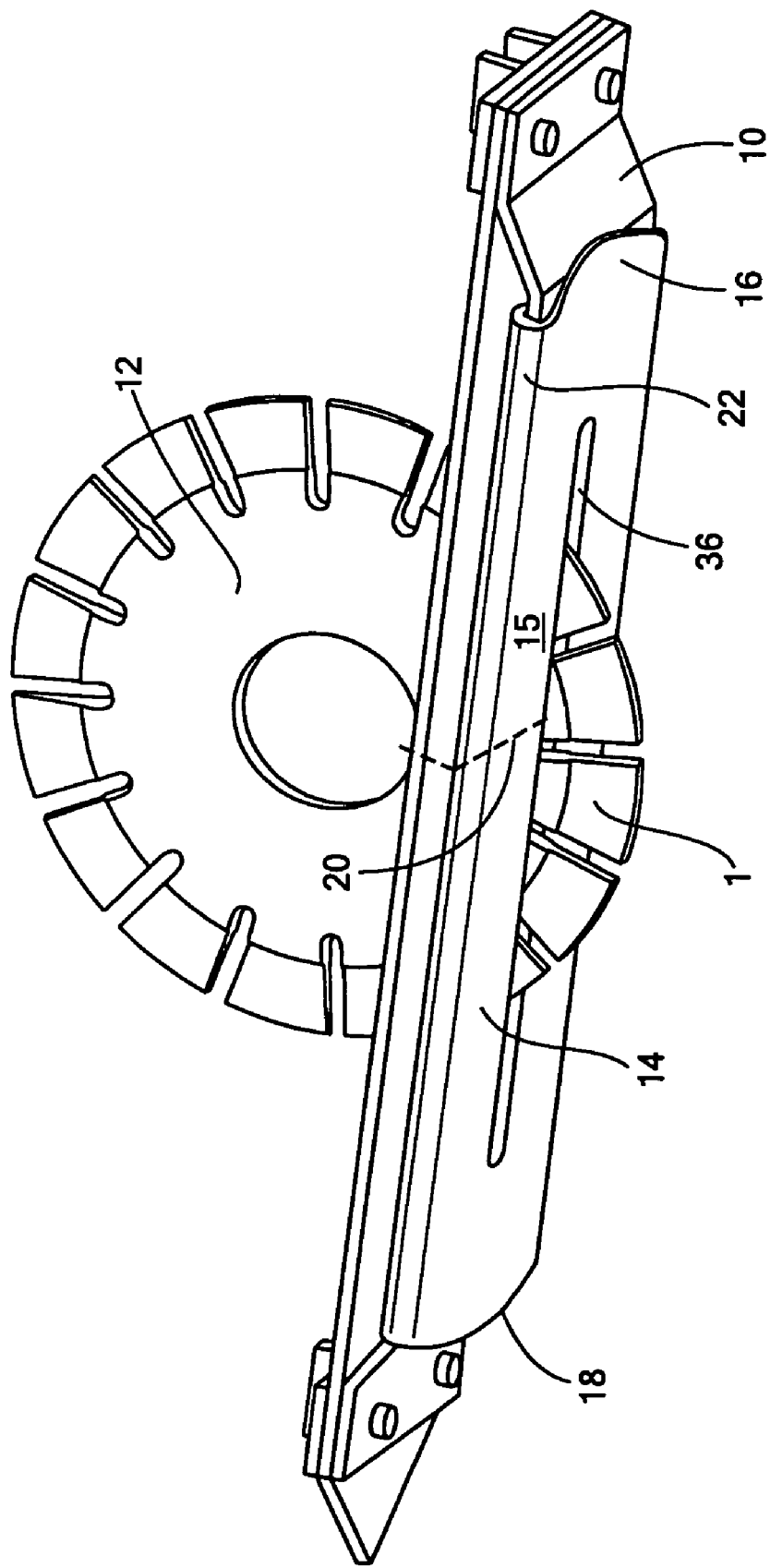
FIG. 1 is a schematic three-dimensional view showing an example of a skid plate shield in accordance with the subject invention fitted onto the skid plate of a saw.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows skid plate 10 and blade 12 of a conventional concrete cutting saw. Planar skid plate shield 14, in accordance with this invention, features flat straight body 15 with leading edge 16 and trailing edge 18 although skid plate shield 14 can be installed in either orientation since shield 14 is typically symmetrical about axis 20. Integrally formed rails 22 and 24, FIGS. 1-3 preferably serve as the mechanism for attaching shield plate body 15 to skid plate 10, FIG. 1 via a convenient snap fit arrangement. As shown more clearly in FIGS. 2-3, leading and trailing edges 16 and 18 are both rounded as shown at 30 and also beveled as shown at 32 to divert debris during operation of the saw. The shield plate can be made of DELRIN® (polyoxymethylene), for example, and may include a pre-cut slot 36 as shown in FIG. 1 or no pre-cut slot as shown in FIGS. 2-3 in which case, after attachment to skid plate 10, FIG. 1, blade 12 forms slot 36.

Figure 2:
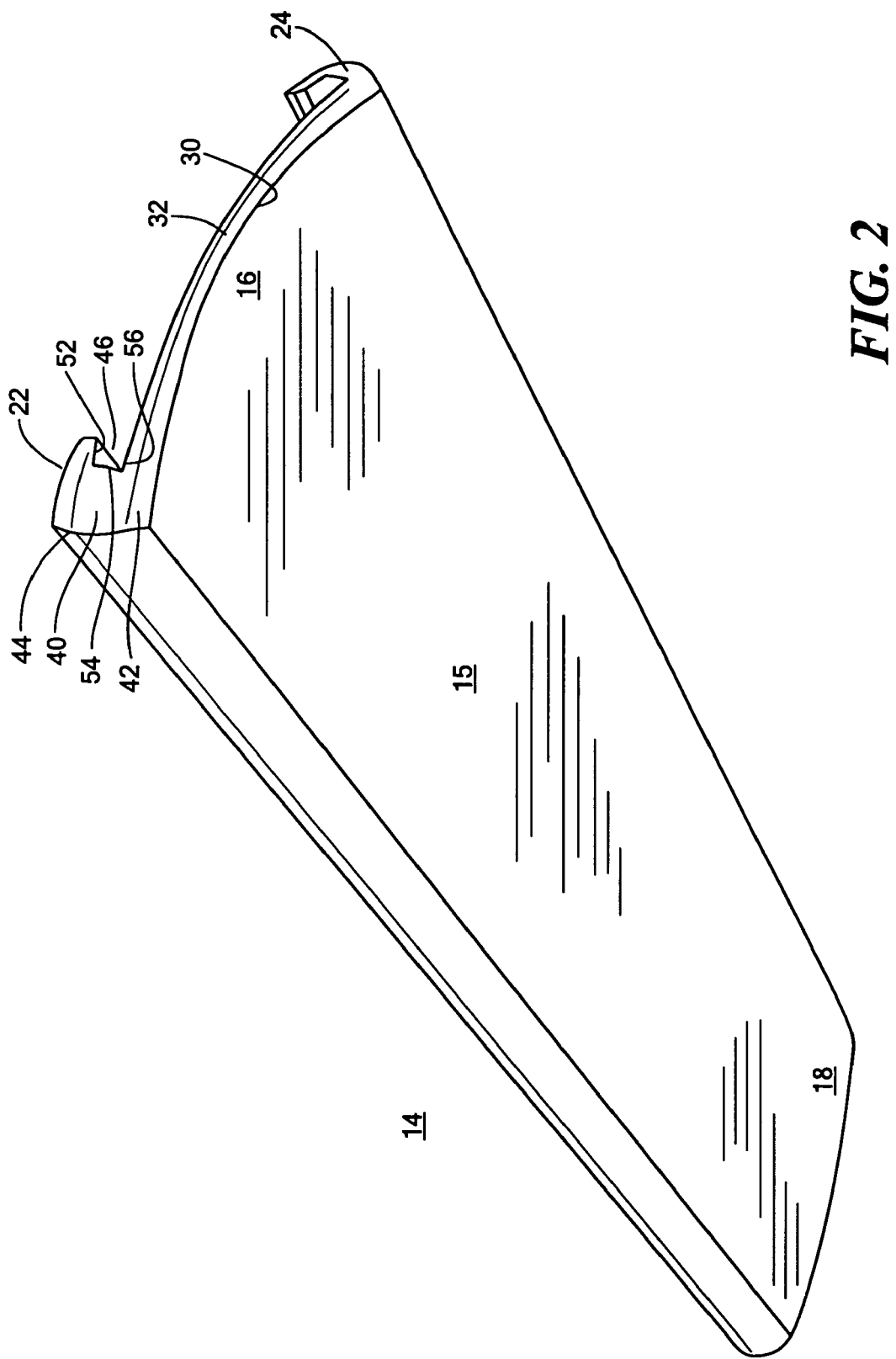
FIG. 2 is a schematic three-dimensional view of the bottom and leading edge of the skid plate shield shown in FIG. 1.
Figure 3:
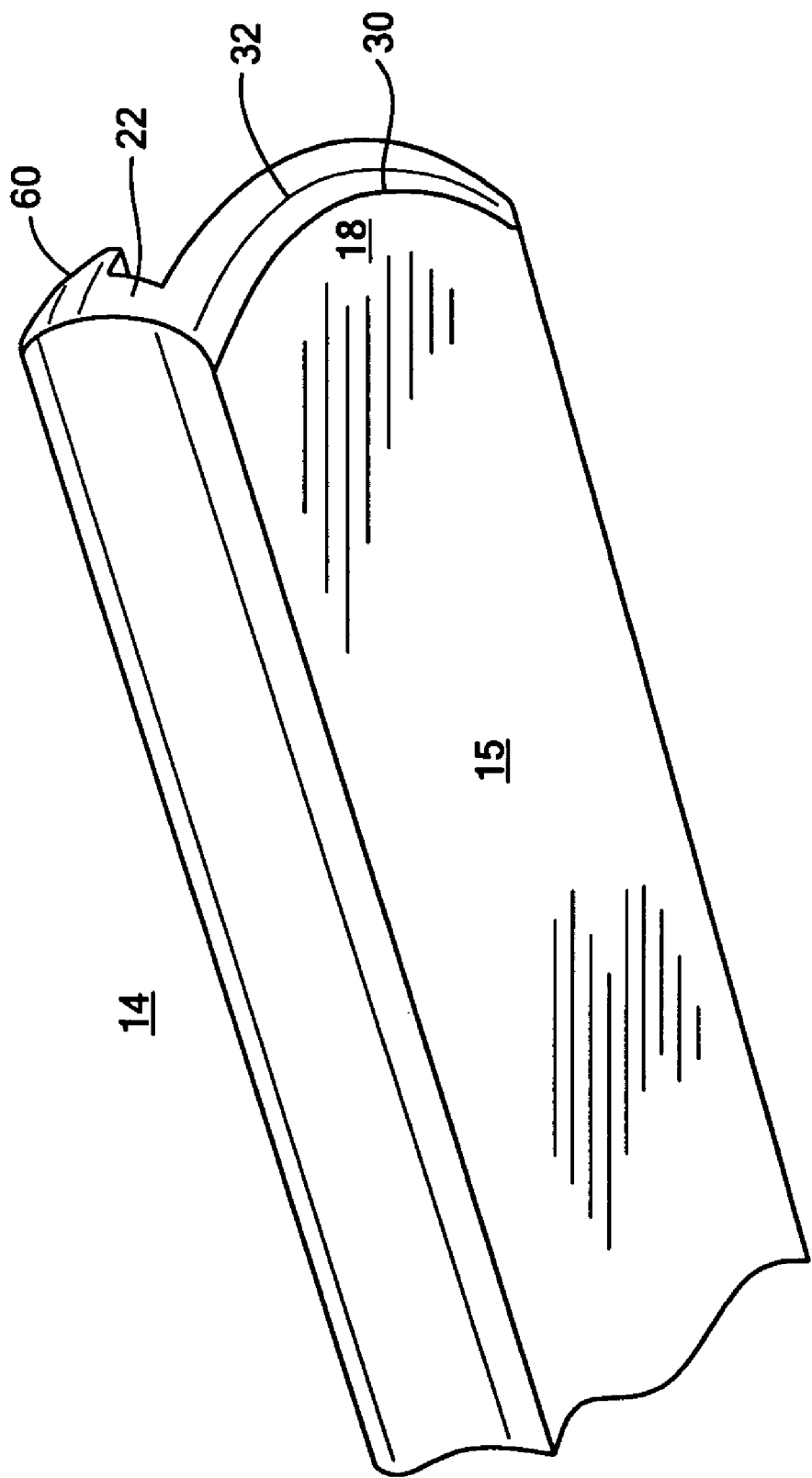
FIG. 3 is a schematic three-dimensional bottom view of the trailing edge of the skid plate shield shown in FIG. 1.

In one preferred embodiment, edge rails 22 and 24, FIGS. 2-3 run the entire length of body 15 and thus also include a leading edge and a trailing edge corresponding to the leading and trailing edges 16 and 18 of the body. In this way, both edges of rails 22 and 24 are also rounded as shown at 40 and beveled as shown at 42 for rail 22. Also, it is preferred that each edge rail is rounded on the outside thereof as shown at 44 and extends inwardly to define a channel 46 for receiving the edges of the skid plate. C-channel 46 has straight edges 52, 54, and 56. As better shown in FIG. 3, the inside top surface of each edge rail is beveled as shown at 60.

Figure 4:
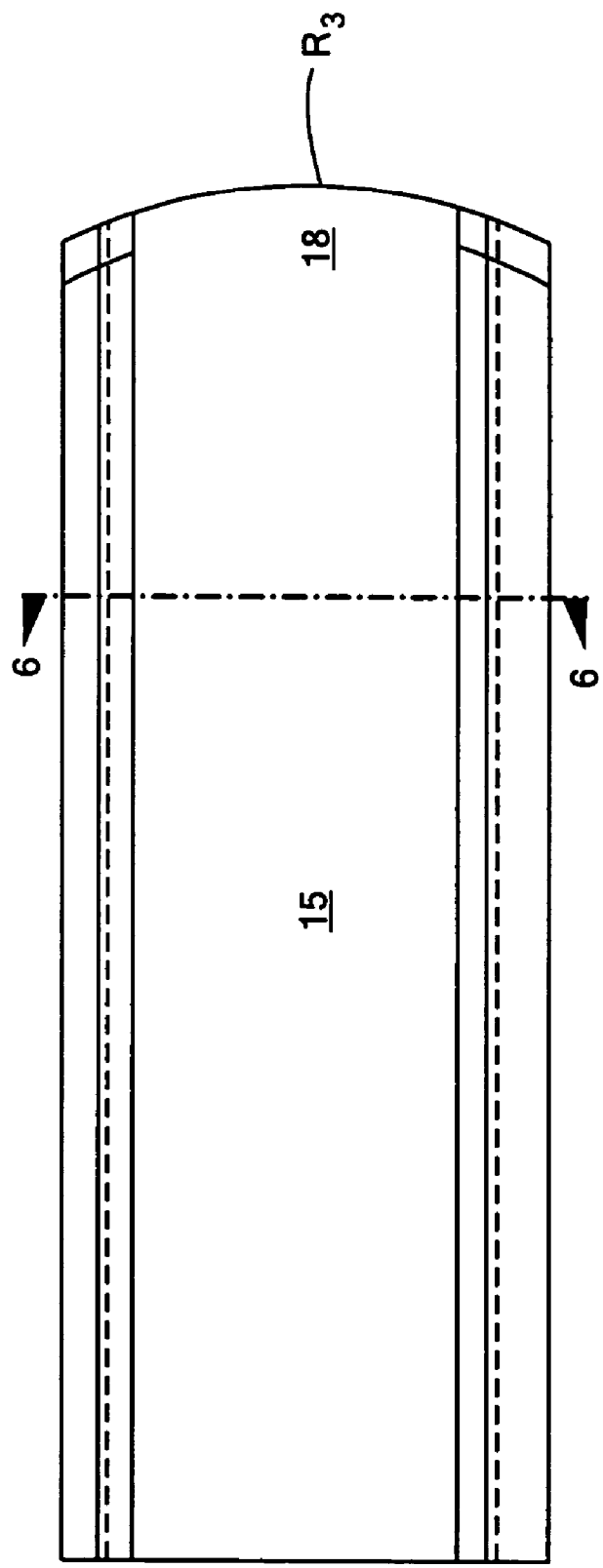
FIG. 4 is a bottom plan view of a portion of the skid plate shield shown in FIGS. 1-3.
Figure 5:
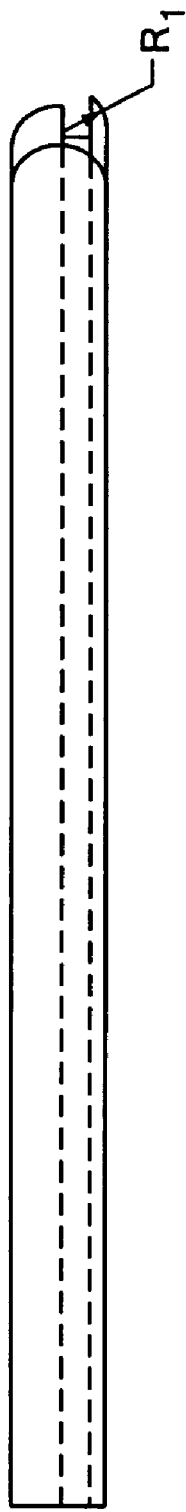
FIG. 5 is a planar side view of a portion of the skid plate shown in FIG. 4.
Figure 6:
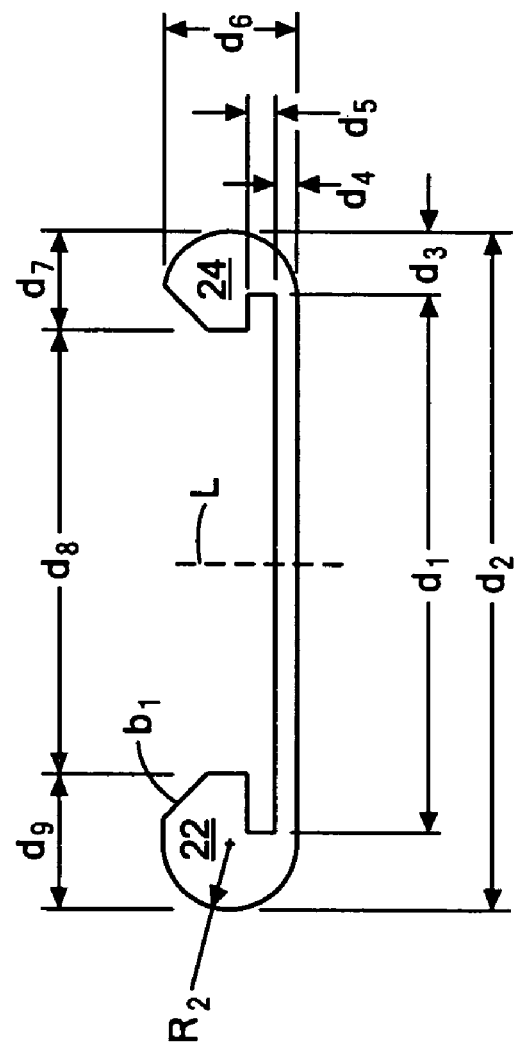
FIG. 6 is a cross-sectional view taken along lines 6-6 of FIG. 4.

The distance $d_1$, FIG. 6 between the inside surfaces of the edge rails is configured such that the shield can be snap fit onto an existing skid plate of a predetermined configuration (length and width). The following table illustrates, with respect to FIGS. 4-6, exemplary examples for three different size skid plate shields. All dimensions are in inches.

These features result in a less complex and less expensive skid plate shield which can be snap fit on and off an existing skid plate requiring no tools and no specially configured glide plate. Because of the configuration of the skid plate of the subject invention, there is a reduction in debris between the shield and the surface being cut and marring or scratching of the surface is reduced. The skid plate shield of the subject invention is easy to deploy and remove and inexpensive enough to replace as often as necessary.

Although specific features of the invention are shown in some drawings and not in others, however, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A saw skid plate shield comprising:
   a shield body having a beveled and rounded leading edge and a beveled and rounded trailing edge;
   a side rail on each side of the shield body each side rail extending upwardly and inwardly over the shield body defining a channel for receiving the skid plate therein; and
   each side rail having a beveled and rounded leading edge and a beveled and rounded trailing edge.

2. The shield of claim 1 in which the shield body has pre-cut slot therein.

3. The shield of claim 1 in which the shield body is configured to have a distance between the edge rails so that the shield can be snapped fit onto the skid plate as opposed to being slid onto the skid plate.

| Overall shield length | $d_1$ | $d_2$ | $d_3$ | $d_4$ | $d_5$ | $d_6$ | $d_7$ | $d_8$ | $d_9$ | $R_1$ | $R_2$ | $R_3$ | $b_1$ |
|---|---|---|---|---|---|---|---|---|---|---|---|---|---|
| 5½" | 1.6 | 2.0 | .174 | .062 | .075 | .37 | .274 | 1.35 | .376 | .188 | .188 | 3.25 | ⅛ × 45° |
| 7" | 2.1 | 1.9 | .225 | .062 | .110 | .37 | .65 | 1.85 | .274 | .188 | .188 | 3.25 | ⅛ × 45° |
| 9" | 2.1 | 2.325 | .225 | 0.62 | .110 | .37 | .65 | 1.85 | .274 | .188 | .188 | 3.25 | ⅛ × 45° |

Thus, in these examples, rail 22 is larger than rail 24 or vice versa. In addition, or alternatively, rail 24 can be further away than rail 22 from center line L of the shield body, (e.g., by approximately 0.05") to assist in snap fitting the shield onto a skid plate.

4. The shield of claim 1 in which one edge rail is larger than the other and/or further away from the center of the shield plate body than the other.

* * * * *